United States Patent [19]
Elliott

[11] Patent Number: 4,787,608
[45] Date of Patent: Nov. 29, 1988

[54] NYLON BEAD REINFORCEMENT RING FOR FLUID PRESSURE DEVICES

[75] Inventor: Robert F. Elliott, Westfield, Ind.

[73] Assignee: The Firestone Tire & Rubber Company, Akron, Ohio

[21] Appl. No.: 3,513

[22] Filed: Jan. 15, 1987

[51] Int. Cl.[4] .................... F16F 9/04; F16J 3/00; B60C 5/01; B60C 15/00

[52] U.S. Cl. .................... 267/64.27; 92/47; 152/452; 152/540; 267/64.19

[58] Field of Search ............ 267/64.27, 64.24, 64.23, 267/64.21, 64.19, 152, 153, 292; 188/298; 92/46, 47, 41, 103 F, 103 SD; 152/547, 540, 539, 452, 544, 527; 524/471; 280/711, 714

[56] References Cited

U.S. PATENT DOCUMENTS

| | | | |
|---|---|---|---|
| 2,216,835 | 9/1938 | Carothers | 524/471 |
| 2,757,701 | 8/1956 | Henson | 152/540 |
| 2,798,507 | 7/1957 | St. Clair | 92/47 X |
| 2,874,458 | 2/1959 | Smith | 267/64.27 X |
| 2,939,698 | 6/1960 | Polhemus | 267/64.24 |
| 2,950,104 | 8/1960 | Bowser | 267/64.27 |
| 2,961,033 | 11/1960 | Galbraith | 267/64.27 X |
| 2,996,103 | 8/1961 | Hollis | 156/478 |
| 3,237,674 | 3/1966 | Budd | 152/362 |
| 3,475,015 | 10/1969 | Hirst | 267/64.24 |
| 3,549,142 | 12/1970 | Tilton | 267/64.27 |
| 3,667,707 | 6/1972 | Mui | 248/20 |
| 3,802,686 | 4/1974 | Moulton | 267/64.27 |
| 3,897,941 | 8/1975 | Hirtreiter | 267/64.24 |
| 4,168,193 | 9/1979 | Brunet | 156/131 |
| 4,231,408 | 11/1980 | Replin | 152/353 R |
| 4,273,176 | 6/1981 | Wyman et al. | 152/322 X |
| 4,320,791 | 3/1982 | Fujii et al. | 152/547 X |
| 4,436,128 | 3/1984 | Pointer | 152/209 R |
| 4,623,011 | 11/1986 | Kanuma | 428/475.5 X |

FOREIGN PATENT DOCUMENTS

| | | | |
|---|---|---|---|
| 0226552 | 8/1958 | Australia | 92/103 F |
| 732494 | 4/1966 | Canada | |
| 2609392 | 9/1977 | Fed. Rep. of Germany | 267/DIG. 2 |
| 2904521 | 8/1980 | Fed. Rep. of Germany | |
| 3007772 | 9/1981 | Fed. Rep. of Germany | 264/501 |
| 55-127210 | 1/1980 | Japan | |
| 0066007 | 4/1982 | Japan | 152/540 |
| 861469 | 7/1957 | United Kingdom | 267/64.27 |
| 0819728 | 9/1959 | United Kingdom | 267/64.27 |
| 2117866 | 10/1983 | United Kingdom | 267/64.27 |

Primary Examiner—Andres Kashnikow
Assistant Examiner—Robert J. Oberleitner
Attorney, Agent, or Firm—Ronald Brietkrenz

[57] ABSTRACT

Air springs or other fluid pressure devices have flexible elastomeric sleeves terminating in a pair of end beads which are clamped or crimped onto a pair of spaced end members. Each of the beads is reinforced by a solid annular ring of nonreinforced thermoplastic material which is molded within the sleeve beads. The rings preferably are formed of nylon and are sufficiently flexible to move with the end members and sleeve and return to their original shape after such movement. A similar nonreinforced plastic ring may be molded in a central portion of the elastomer sleeve to provide the girdle hoop of the sleeve.

6 Claims, 2 Drawing Sheets

NYLON BEAD REINFORCEMENT RING FOR FLUID PRESSURE DEVICES

TECHNICAL FIELD

The invention relates to flexible elastomeric sleeves used in fluid pressure devices, and in particular to a plastic ring for reinforcing the annular beads or for the formation of a girdle hoop of the elastomeric sleeve of an air spring.

BACKGROUND ART

Flexible elastomeric sleeves are used in various types of fluid pressure systems and devices such as air springs which are used as both vibration isolators and actuators. These pneumatic devices or air springs as they are commonly referred to are used for a variety of applications. One particular application is providing cushioning or vibration isolation between movable parts of a vehicle to absorb shock loads impressed on the vehicle axis by the wheels striking an object on the road or entering into a depression. Many of these devices also are used as actuators to provide movement between two parts of a machine or piece of equipment.

Most of these air springs have annular beads at the ends of a flexible elastomeric sleeve which forms a fluid pressure chamber, which beads are clamped or crimped onto rigid end members or end plates. The end members are mounted on spaced portions of a vehicle or other equipment on which the air springs are mounted. Currently, these beads are internally reinforced with high strength wire which is wound into a continuous diameter or ring and then molded within the ends of the flexible sleeves to assist in maintaining the sleeve beads in an airtight sealing relationship with the end members. These bands are also molded into a midpoint of the sleeves to form a girdle hoop therefor for certain applications.

Although these prior steel band or wire reinforced beads and girdle hoops are satisfactory, they increase the weight of the air spring and increase the cost of the device due to the expense of the wire. Also, additional manufacturing costs are required for forming the wire into an annular band prior to molding it within the ends or midsection of the elastomeric sleeve.

Some examples of prior art devices using a reinforced bead are shown in the following patents.

U.S. Pat. No. 3,897,941 shows a type of flexible resilient tubular member used in a fluid pressure system having a reinforced bead in which the reinforcement is an annular metal band located at each end of the resilient member.

U.S. Pat. No. 3,237,674 discloses a reinforcing bead ring used as part of a bead assembly for pneumatic tires in which the bead assembly has a resin-impregnated glass fiber material combined with an epoxy resin matrix and molded into a hoop-like configuration which is molded within the bead area of a pneumatic tire.

U.S. Pat. No. 4,168,193 discloses a tire bead ring configuration in which a generally annular ring is held in place within a filled rubber compound which has been injection molded to provide reinforcement of a tire bead. The bead core is indicated as being strands of wire or fiberglass.

U.S. Pat. No. 4,231,408 discloses a tire having a plurality of elongated reinforcing members mounted in the sidewall area of the tire which are formed as a single unit of a wire reinforced rubber tape, rayon, nylon, polyester, aramid, fiberglass, steel, bronze coated steel, or the like.

Japanese Pat. No. 55-127210 discloses a bead wire formed with a circular cross sectional configuration or a six-sided configuration.

Although the prior bead reinforcements and girdle hoops formed of wire have proved satisfactory, they increase the cost of the fluid pressure device and the weight thereof. Attempts have been made to form the bead of a fiber reinforced synthetic material but such reinforcements have been found to be unsatisfactory due to the brittleness and stiffness of the bead ring preventing it from flexing sufficiently with the movement of the fluid pressure device.

Therefore the need has existed for a reinforcing ring used as a bead reinforcement or girdle hoop which is less expensive to manufacture and lighterweight than existing metal bands, and which is sufficiently flexible to move repeatedly with the flexible elastomeric sleeve without breaking.

DISCLOSURE OF THE INVENTION

Objectives of the invention include providing a plastic reinforcement ring for a fluid pressure device and in particular for an air spring, in which the ring is a solid nonreinforced member formed of a thermoplastic, preferably nylon, which is molded within the bead ends of a flexible elastomeric sleeve which is adapted to be clamped or crimped to spaced end plates or end members to provide an internal fluid pressure chamber. Another objective is to provide such an improved bead reinforcement primarily for use on air springs replacing the heretofore more expensive and heavier wire strand bead reinforcement.

A still further objective of the invention is to provide an improved bead reinforcement which is formed of a solid nonreinforced thermoplastic material which enables the ring to flex and move with the movements of the flexible sleeve and end mounting plates and absorb the forces continuously exerted on the pressure device without becoming brittle or breaking, and which has sufficient flexibility and material memory permitting the ring to return to its natural unstressed state.

Another objective is to provide such an improved reinforcement ring which can be injection molded in a simple, inexpensive and mass production type of manufacturing operation thereby reducing the cost of the ring, and in which the reinforcement ring can be molded into the bead areas of the elastomeric sleeve simply and easily without the molding operation effecting the operating characteristics of the ring, and which results in a lighter weight fluid pressure device.

A further objective is to provide such an improved reinforcement ring which can be molded into the flexible elastomeric sleeve, intermediate the bead ends, to provide the girdle hoop therefor replacing the heretofore metal ring required for such a girdle hoop construction, again reducing the weight and cost of the final fluid pressure device.

These objectives and advantages are achieved by the improved reinforcement ring construction which is adapted to be mounted in a fluid pressure device of the type having a pair of spaced end members and an intervening flexible sleeve, and a pair of annular end beads connected to said end members for forming a fluid pressure therebetween, in which the improvement includes providing an annular solid thermoplastic bead ring molded within the end beads of said sleeve.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

BEST MODE FOR CARRYING OUT THE INVENTION

Figure 1:
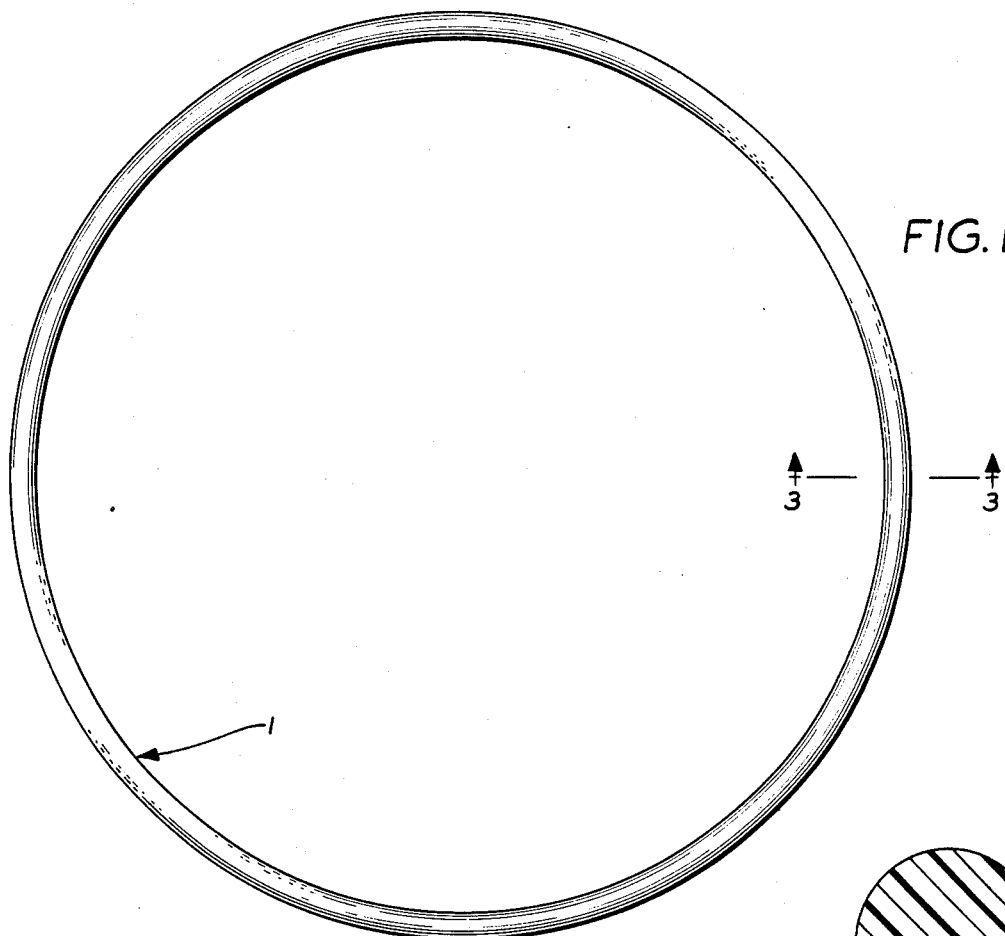
FIG. 1 is a plan view of the improved plastic reinforcement ring of the invention.
Figure 3:
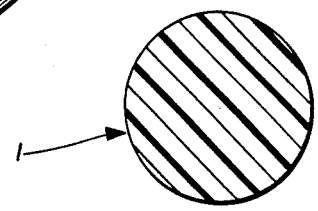
FIG. 3 is a greatly enlarged sectional view taken on line 3—3, FIG. 1.
Figure 2:
FIG. 2 is an end elevational view of the reinforcement ring of FIG. 1.

The improved reinforcement ring is indicated generally at 1, and is an annular band or ring molded of a solid non-reinforced thermoplastic material, preferably uniformly in cross section as shown in FIG. 3. Ring 1 will have a thickness and diameter compatible with the particular fluid pressure device with which it is intended to be used.

Figure 4:
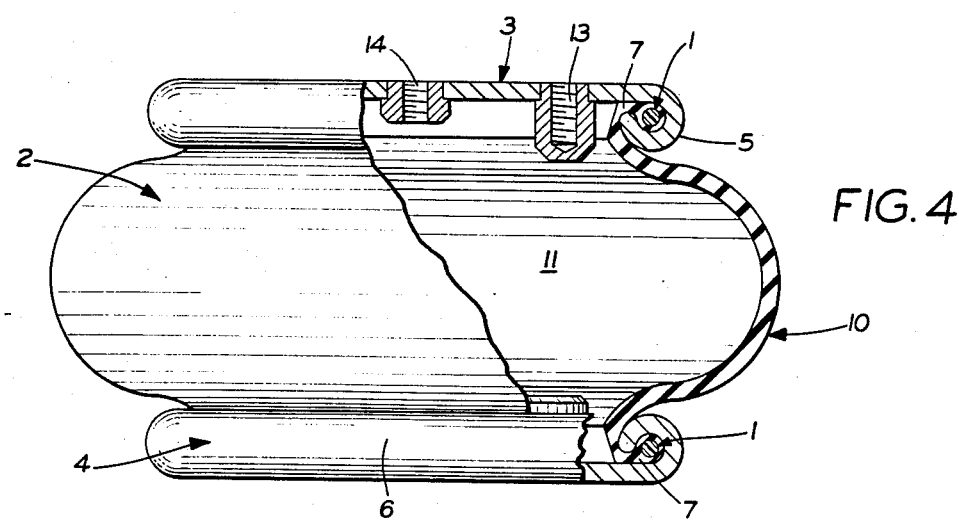
FIG. 4 is an elevational view with portions broken away and in section, of an air spring having the improved reinforcement ring incorporated in the end beads thereof.

A usual fluid pressure device with which bead ring 1 will be used is shown in FIG. 4. The device is an air spring and is indicated generally at 2, and has upper and lower end plates, indicated generally at 3 and 4, which are formed of stamped steel or similar material, having rolled ends 5 and 6, respectively. The rolled ends are crimped about annular beads 7 formed integrally on the ends of a hollow flexible elastomeric sleeve indicated generally at 10, which forms a fluid pressure chamber 11 therein.

End plates 3 and 4 may be formed with internally threaded bosses 13 for receiving threaded fasteners (not shown) for mounting the end plates on a supporting structure. A threaded hole 14 also may be formed in one or both of the end plates to provide an access opening for the pressurized air or other fluid of fluid pressure chamber 11. End plates 3 and 4 may have other configurations than that shown in FIG. 4 without effecting the concept of the invention and are components well known in the art. Furthermore, the improved plastic reinforcement ring of the invention may be used with other types of fluid pressure devices and systems which are similar in many respects to air spring 2 shown in FIG. 4. Air spring 2 is used as an illustration of the type of device with which the improved bead reinforcement is intended to be incorporated.

In accordance with one of the main features of the invention, it has been discovered that formation of reinforcement ring 1 of a solid nonreinforced high strength thermoplastic material provides an annular ring which has sufficient flexibility to be compatible with the final device, which enables the ring to move in various directions upon forces being exerted on the device, while possessing sufficient material memory whereby it returns to its unstressed position without breaking or deforming. Examples of thermoplastic compounds include nylon, that is polyamide, polyester, polyurethane, and the like. The nylons are preferred for use in the present invention and include nylons made from internal lactams, as well as nylons made from diamines and dibasic acids. The nylon made from hexamethylenediamine and adipic acid (nylon 66) is preferred. A suitable nylon 66 type which has been found to be very suitable in the present invention is a controlled cyrstalization nylon sold under the designation Nylon 1310 by Celanese Corporation. This nylon generally has a comparatively high tensile strength, for example 13,600 psi at 73° F., a very high yield strength, approximately 13,600 psi at 73° F. as well as a high flexural modulus, that is approximately 470,000 psi at 73° F. The melting point of this particular nylon is approximately 495° F. with a deflection temperature at 66 psi of 425° F. and at 264 psi of 171° F.

Figure 5:
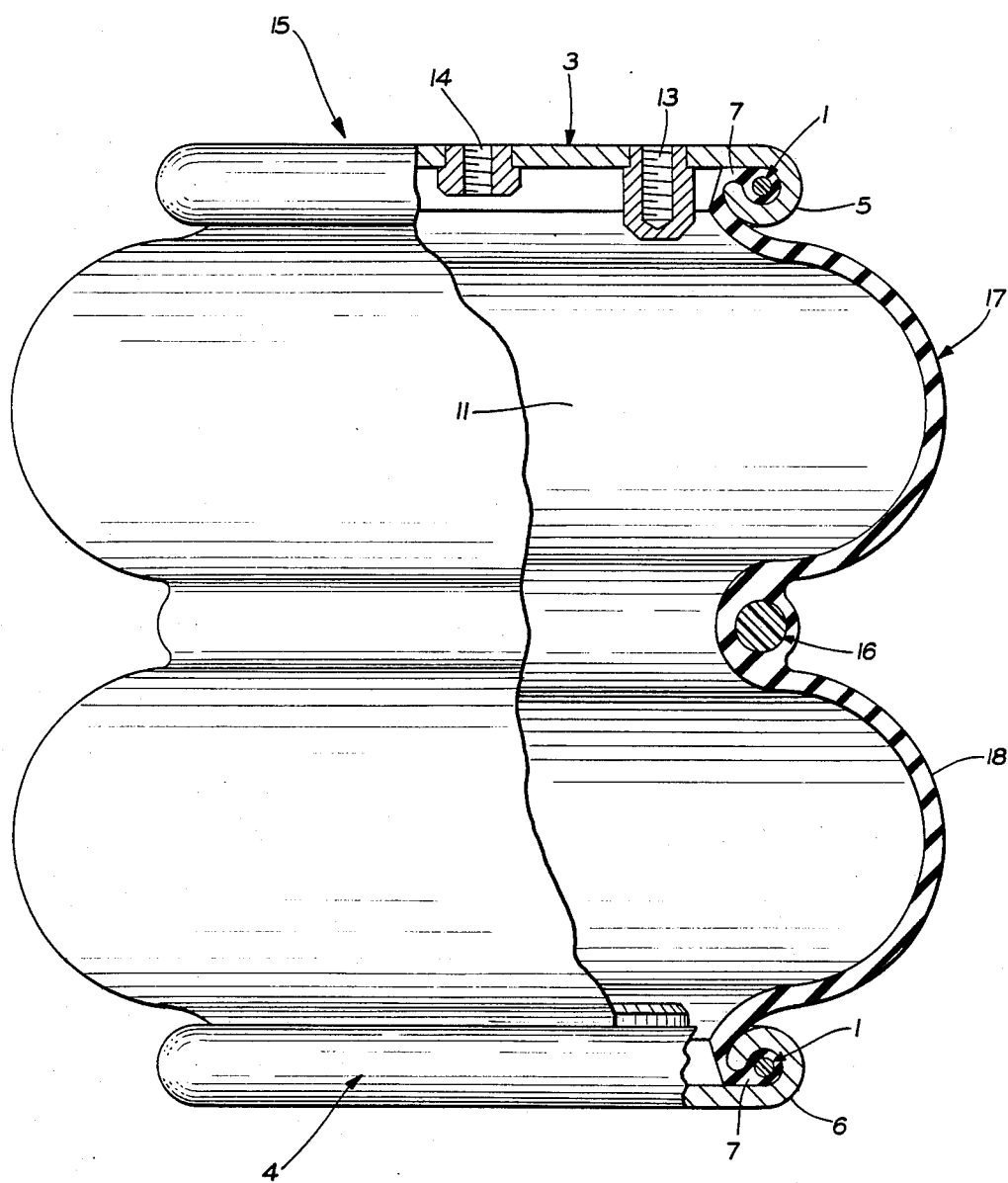
FIG. 5 is an elevational view with portions broken away and in section similar to FIG. 4, showing the improved reinforcement ring being used as a girdle hoop in the flexible sleeve of an air spring.

Another improved fluid pressure device, indicated generally at 15, having a reinforcement ring incorporated therein is shown in FIG. 5 and is an air spring similar to that of FIG. 4 with the addition of a girdle hoop 16. Hoop 16 is formed of the same nonreinforced thermoplastic material as is ring 1 described above and is molded integrally within sidewall 18 of a flexible sleeve 17 during the formation thereof. Heretofore, such girdle hoops were formed of the same metal wire as the wire bead reinforcement band and have the same disadvantages, that is, increased manufacturing costs and increased weight to the final product. Girdle hoop 16 can be molded into sleeve sidewall 18 simultaneously with the molding of bead rings 1 in beads 7.

The thickness of the bead reinforcement ring may vary in relationship to the diameter of the ring in order to meet various application criterion. When used in air spring applications such as shown in FIG. 4, it has been found that bead ring 1 has a thickness of approximately 0.125 inches with a nominal ring diameter of approximately 3.5 inches and may have an increased thickness of approximately 0.156 inches for rings having diameters in the range of 4.28 inches up to and including diameters of 10.3 inches.

Accordingly, it has been found that the improved bead reinforcement ring as set forth above, when incorporated into a fluid pressure device in the bead area and/or midpoint area of the flexible elastomeric sleeve, provides a device lighter in weight, less expensive to manufacture, without sacrificing the operating characteristics, efficiency and life of the device.

Accordingly, the improved plastic reinforcement ring is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved plastic reinforcement ring for fluid pressure devices is constructed and used, the characteristics of the construction, and the advantageous, new and useful results obtained; the new and useful structures, devices, elements, arrangements, parts, and combinations, are set forth in the appended claims.

What is claimed is:

1. A fluid pressure device including a pair of spaced end members and an intervening flexible elastomeric sleeve forming a fluid pressure chamber therein; a solid one-piece bead ring having a uniform cross section formed of a nonreinforced nylon and molded within each of the ends of the elastomeric sleeve, said bead rings being free of any interconnecting reinforcing members extending therebetween and connected to said bead rings; and said spaced end members each having an annular rolled end crimped about a respective one of the bead rings forming a fluid tight seal therebetween.

2. The fluid pressure device defined in claim 1 in which the nylon is an aliphatic nylon.

3. The fluid pressure device defined in claim 1 in which a third ring of nonreinforced thermoplastic material is molded in the elastomeric sleeve intermediate the two end rings.

4. The fluid pressure device defined in claim 1 in which the nylon is nylon 66 having a tensile strength and yield strength of approximately 13,600 psi at 73° F. and a high flexural modulus of approximately 470,000 psi at 73° F.

5. The fluid pressure device defined in claim 4 in which the nylon has a melting point of approximately 495° F. with a deflection temperature at 66 psi of 425° F. and at 264 psi of 171° F.

6. The fluid pressure device defined in claim 1 in which each of the bead rings is circular in cross section.

* * * * *